United States Patent [19]
Sullivan

[11] Patent Number: 5,569,380
[45] Date of Patent: Oct. 29, 1996

[54] PORTABLE WATER FILTERING DEVICE

[76] Inventor: John L. Sullivan, 1362 NE. 117 St., Miami, Fla. 33161

[21] Appl. No.: 344,917

[22] Filed: Nov. 25, 1994

Related U.S. Application Data

[63] Continuation-in-part of Ser. No. 65,418, May 24, 1993, Pat. No. 5,456,831.

[51] Int. Cl.$^6$ .................................................. C02F 9/00
[52] U.S. Cl. .......................... 210/266; 210/282; 210/283; 210/284; 210/449
[58] Field of Search ................................... 210/668, 266, 210/282–284, 290, 449, 501

[56] References Cited

U.S. PATENT DOCUMENTS

| | | | |
|---|---|---|---|
| 3,389,803 | 6/1968 | Barley | 210/282 |
| 3,923,665 | 12/1975 | Lambert et al. | 210/501 |
| 4,196,081 | 4/1980 | Pavia | 210/283 |
| 4,298,475 | 11/1981 | Gartner | 210/266 |
| 4,995,976 | 2/1991 | Vermes et al. | 210/282 |
| 5,078,874 | 1/1992 | Sullivan | 210/286 |
| 5,149,437 | 9/1992 | Wilkinson et al. | 210/668 |

*Primary Examiner*—Ivars Cintins

[57] ABSTRACT

A device to filter water having a tubular housing with seven chambers therein divided by dividing members and filter screens. The first chamber includes a granular activated carbon filtering medium, the second chamber includes a mixed bed ion exchange resin filter medium, the third chamber being empty, the fourth chamber includes an iodinated filtering medium, the fifth chamber includes a granular activated carbon filtering medium, the sixth chamber has an anion exchange resin filtering medium and the seventh chamber, being adjacent to the sixth chamber and to the outlet port, includes a carbon filtering medium. A faucet adapter is removably connected to the source of water and it is designed to limit the water pressure applied to the device.

8 Claims, 1 Drawing Sheet

U.S. Patent  Oct. 29, 1996  5,569,380
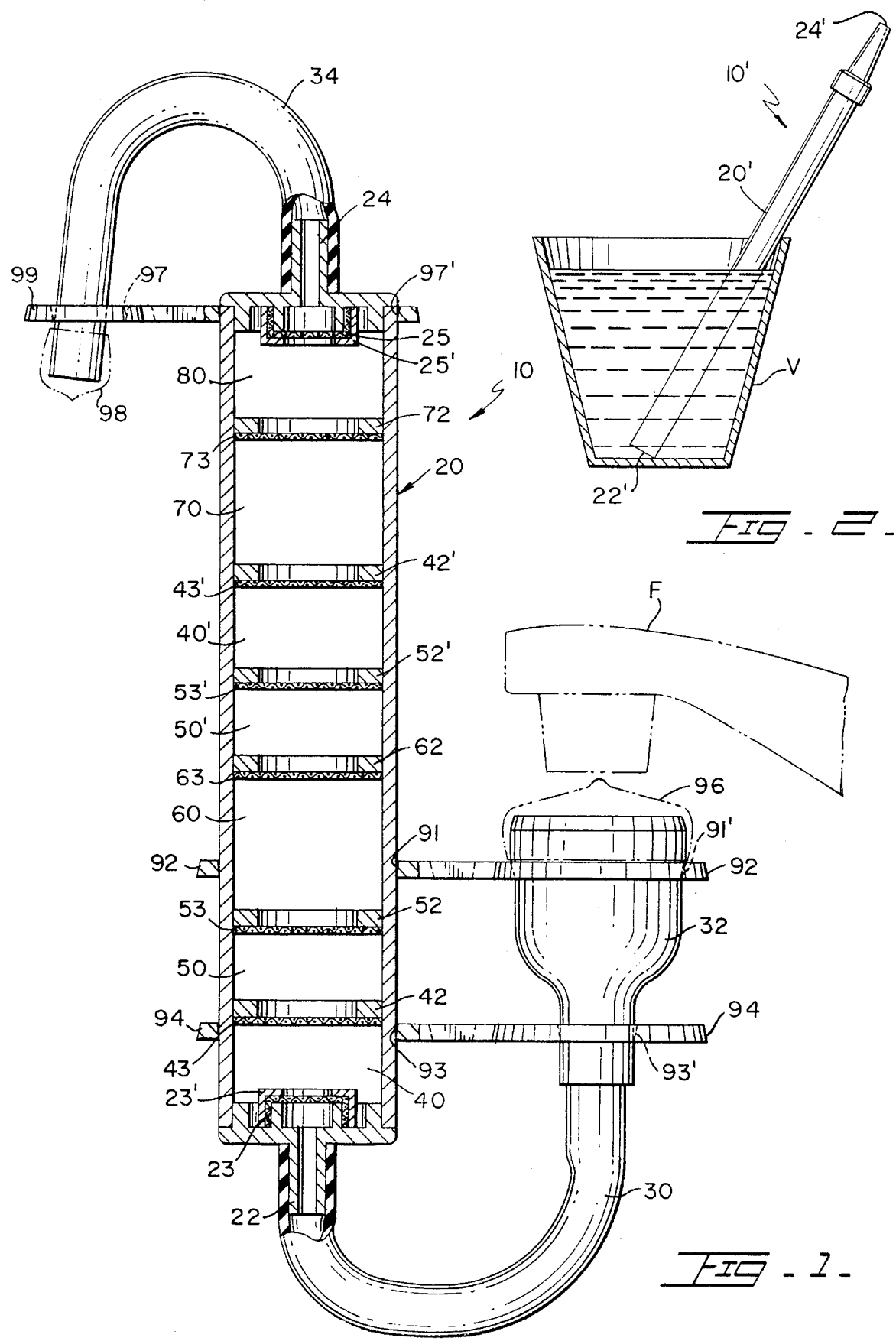

5,569,380

PORTABLE WATER FILTERING DEVICE

OTHER RELATED APPLICATIONS

The present invention application is a continuation-in-part of allowed U.S. patent application Ser. No. 08/065,418, filed on May 24, 1993, now U.S. Pat. No. 5,456,831, which is hereby incorporated by reference.

BACKGROUND OF THE INVENTION

1. Field of the Invention

The present invention relates to a water filtering device, and more particularly, to such a device that is portable.

2. Description of the Related Art

Applicant believes that the closest reference corresponds to U.S. Pat. No. 5,078,874 issued to this applicant. However, it differs from the present invention because the design and configuration in the present application is more volumetrically efficient and it includes a specific arrangement of filtering media that provides a superior performance, as best described below.

Other patents describing the closest subject matter provide for a number of more or less complicated features that fail to solve the problem in an efficient and economical way. None of these patents suggest the novel features of the present invention.

SUMMARY OF THE INVENTION

It is one of the primary objects of the present invention to provide a portable filtering device that can be readily connected to a water faucet and provide good quality filtered water substantially bacteria free.

It is another object of the present invention to provide a filtering device that is volumetrically efficient and that can be readily transported by a user.

It is still another object of the present invention to provide a filtering device that requires a relatively low water pressure to function properly and wherein its filtering media beads can be repositioned through backwashing operations.

It is yet another object of the present invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents an elevational cross-sectional view of the preferred embodiment of the present invention using seven chambers.

FIG. 2 represents the housing detached from the conduit member as it is used to draw the liquid from vessel V.

DETAILED DESCRIPTION OF THE PREFERRED EMBODIMENT

Referring now to the drawings, where the present invention is generally referred to with numeral 10 it can be observed that it basically includes elongated tubular housing 20 that includes inlet port 22 and outlet port 24 at its ends. Device 10, in the preferred embodiment, is connected to a tap water faucet F. Device 10 can also be used like a straw if a user applies suction to outlet port 24.

Inlet port 22, as seen FIG. 1, is removably connected to flexible tubular member 30, at one end thereof, and the other end of flexible tubular member 30 includes faucet adapter 32 that can be readily and removably mounted to a conventional faucet that supplies the tap water to be filtered. Flexible tubular member 30 and faucet adapter 32 are preferably made out of silicone material. Portable water filtering device 10 can also be used as a straw-type filter to draw a liquid from a glass, as it is shown in the parent patent application whose Ser. No. is 08/065,418.

Inside tubular housing 20 there are seven chambers 40; 50; 60; 50'; 40'; 70 and 80 and they are separated by six dividing members 42; 52; 62; 52'; 42' and 72 that are press fit to the internal walls of housing 20. Over the dividing members, a nylon or polypropelene screens 43; 53; 63; 53'; 43' and 73 are used with a mesh of approximately 30 microns. Inlet and outlet filter members 23 and 25 are preferably mounted adjacent to inlet and outlet ports 22 and 24, respectively, and they are intended to remove any large particles that may be contained in the tap water. Members 23 and 25 are preferably made out of nylon screening with a porosity of approximately 30 microns. Retainer cap members 23' and 25' keep 60 micron screens 23 and 25 mechanically in place.

The first chamber 40 is filled with GAC (granular activated carbon) filtering media and it acts as a pre-filter to the liquid being processed. The GAC is incorporated to eliminate tri-halomethines (THM), chloroform, chlorine, pesticides and organic matter from the liquid being processed through the apparatus.

The second chamber 50 is filled with iodinated anion resin, such as, MCV. MCV is a trademark of Umpqua Research Company and stands for "microbial check valve". The liquid being filtered through the apparatus enters (Influent) chamber 50 that contains the iodinated resin. As the organisms pass through the chamber, the cell wall is impregnated with $I_2$ ions released by the resin. At the same time, $I_2$ is released into the water to continue washing the cells with a weak iodine solution at a concentration of four ppm.

The third chamber 60 is empty. The water along with the bacteria and any viruses it may contain now enters into chamber 60 from chamber 50. Chamber 60 is known as a retention or void area. Our tests have shown that it takes a 5 second retention time to kill a bacteria concentration of $10^5$/c.c and a ten second retention to kill a bacteria concentration of $10^7$/c.c. This retention or void area ensures the user that the iodine is in contact with the bacteria for a sufficient duration of time to ensure a complete killing of any harmful bacteria or viruses. Bacteria in nature are rarely found in a concentration greater than $10^3$/c.c unless the water contains raw sewage. As you can see, we want the iodinated products to do more than we are required to ensure a complete kill and a quality reputation.

Fourth chamber 50' is similar to second chamber 50 and contains the same MCV (microbial check valve) filter, which in the preferred embodiment.

In contrast with the disclosure in U.S. Pat. No. 5,078,874 and the parent patent application, dividing the ionidated anion resin with a void chamber in the middle increases the efficiency in the elimination of bacteria with the same amount of filtering media. Experiments have shown that if an MCV (microbial check valve), such as the one disclosed in said patent, is divided by a void chamber, and the amount of iodinated anion resin is approximately the same, the filtered water contains less bacteria than if the entire amount of iodinated anion resin is placed in a chamber that precedes a void chamber. This is a direct consequence of enlarging the contact time duration of the bacteria with the iodinated water.

Chamber 50 interacts with the bulk of the bacteria since it is the first to be exposed. The resulting iodinated solution is delayed inside adjacent void chamber 60 with the consequent interaction thereby continuing the action in the elimination of bacteria. And, then finally the water being filtered passes to chamber 50' where again the iodine concentration is high and consequently kills almost all the remaining bacteria.

Chamber 40' is similar to chamber 40 and it contains the same filtering media, GAC. The objective of introducing the GAC chamber before the next chamber containing the anion exchange resin is to lengthen the latter's life. Chamber 40' removes the bulk of the iodine from the water which tends to neutralize the anion exchange resin.

The sixth chamber 70 includes an anion exchange resin. Thus, as shown in FIG. 1, the water flows from GAC area 40' into the anion exchange resin chamber 70. The anion exchange resin, through ion exchange, removes any possible compounds of iodines that may have formed in the water.

The seventh chamber 80 includes GAC (granular activated carbon) filtering media, as does chamber 40. In addition, chamber 80 is the final chamber incorporated into the filtering process. The chamber 80 is filled with granular activated carbon (GAC) to remove any residual $I_2$ along with reducing organics, color, odor and other tastes from the water. If the water is allowed to enter the anion exchange resin chamber 70 or the GAC chamber 80 too soon or too fast, the iodine could be pulled from the cell walls before a complete removal of the harmful bacteria and/or viruses can be achieved. Depending on the concentration level of bacteria in the liquid, some of the bacteria may survive. The flow rate through the iodinated products must be in direct proportion to the amount of resin and retention/void area to maintain a ten second contact time.

Additionally, faucet adapter 32 together with tube 30 is attached to the influent of the travel device whereby the user can maintain control of the water flow. It has been discovered that by incorporating the use of a diverter on the faucet head you can maintain control of flow rates. Portable water filtering device 10 can be provided with an even smaller filter screen of 20 microns that would cause the faucet adapter to pop off sooner if too much pressure flow is applied. In the preferred embodiment, the flow rate is such that it takes at least 12 minutes to process (filter) one gallon of water. This will ensure the optimum compromise between greater bacteria killing effect and the desirability of faster water flow.

Dual retainer rings 92 and 94 are disposed in a parallel and spaced relationship with respect to each other and removably mounted to housing 20. Faucet adapter 32 is removably receiving by openings 91' and 93' of dual retainer rings 92 and 94. Also, these ring members keep housing 20 and faucet adapter 32 in parallel relationship to each other. Openings 91 and 93 have cooperative dimensions to permit a snug fit of housing 20.

Cap members 96 and 98 cover the end terminals of the preferred embodiment. Cap members 96 and 98 are designed to provide hygienic protection by avoiding contact of faucet adapter 32, in contact with unfiltered water, and the end of flexible tubular member 30 through which filtered water runs out.

Dual holding ring member 99 is removably mounted to housing 20 and it is provided with holding opening 97. The distal end of flexible tubular member 34 is removably inserted through opening 97 thereby directing the outlet water downwardly. Opening 97' has cooperative dimensions to provide a snug fit of housing 20.

As shown in FIG. 2, a user can draw the liquid from outlet port 24' by way of inlet port 22' and use the atmospheric pressure to force the water up through tubular housing 20', in portable filtering device 10'. In addition, device 10' includes the same chambers and filtering media as is disclosed in device 10. In sum, device 10' is useful in places where there is no access to pressurized tap water.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A device to filter water removably connected to a supply of low pressure water, comprising:

A) an elongated tubular housing having two ends, an inlet port in one of said ends and an outlet port in the other end, said elongated tubular housing includes six dividing filter members, each of said dividing member including an opening and a screen mounted against each dividing member covering said opening thereby defining first, second, third, fourth, fifth, sixth and seventh chambers, and said first chamber being the one that is adjacent to said inlet port including a granular activated carbon filtering medium, said second chamber being adjacent to the first including an iodinated anion resin filtering medium, said third chamber, being adjacent to said second chamber, being empty, said fourth chamber, being adjacent to said third chamber, including an iodinated resin filtering medium, said fifth chamber, being adjacent to said fourth chamber, including a granular activated carbon filtering medium, said sixth chamber, being adjacent to said fifth chamber, including an anion exchange resin filtering medium, said seventh chamber, being adjacent to said sixth chamber and to said outlet port, including a granular activated carbon filtering medium; and B) faucet adapter means for limiting the magnitude of the water pressure applied to said inlet port and said faucet adapter further including a flexible tubular conduit, having first and second ends, and said first end being connected to said faucet adapter means and said second end being removably connected to said inlet port so that backwashing can be accomplished thereby removing particulate matter from the surface of said filtering media in said chambers and their redistribution.

2. The device set forth in claim 1 wherein said elongated tubular housing further includes inlet and outlet filtering means adjacent to said inlet and outlet ports.

3. The device set forth in claim 2 wherein said inlet and outlet filtering means have cap members to mechanically keep them in place.

4. The device set forth in claim 3 wherein said inlet and outlet filtering means have 60 microns screens.

5. A device to filter water from a vessel, comprising an elongated tubular housing having an inlet port and an outlet port, said elongated tubular housing including six dividing members mounted therein thereby defining first, second third, fourth, fifth, sixth and seventh chambers, and said first chamber being the one that is adjacent to said inlet port including a granular activated carbon filtering medium, said second chamber being adjacent to the first including an iodinated anion resin filtering medium, said third chamber, being adjacent to said second chamber, being empty, said fourth chamber, being adjacent to said third chamber, including an iodinated resin filtering medium, said fifth chamber, being adjacent to said fourth chamber, including a granular activated carbon filtering medium, and sixth chamber, being adjacent to said fifth chamber, including an anion exchange resin filtering medium, said seventh chamber, being adjacent to said sixth chamber, and to said outlet port, including a granular activated carbon and said outlet port being drawn upon by the section of a user's mouth and said inlet port being submerged in said water contained in said vessel.

6. The device set forth in claim 5 wherein said elongated tubular housing further including inlet and outlet filtering means adjacent to said inlet and outlet ports.

7. The device set forth in claim 6 wherein said inlet and outlet filtering means have cap members to mechanically keep them in place.

8. The device set forth in claim 7 wherein said inlet and outlet filtering means have 60 microns screens.

\* \* \* \* \*